UNITED STATES PATENT OFFICE.

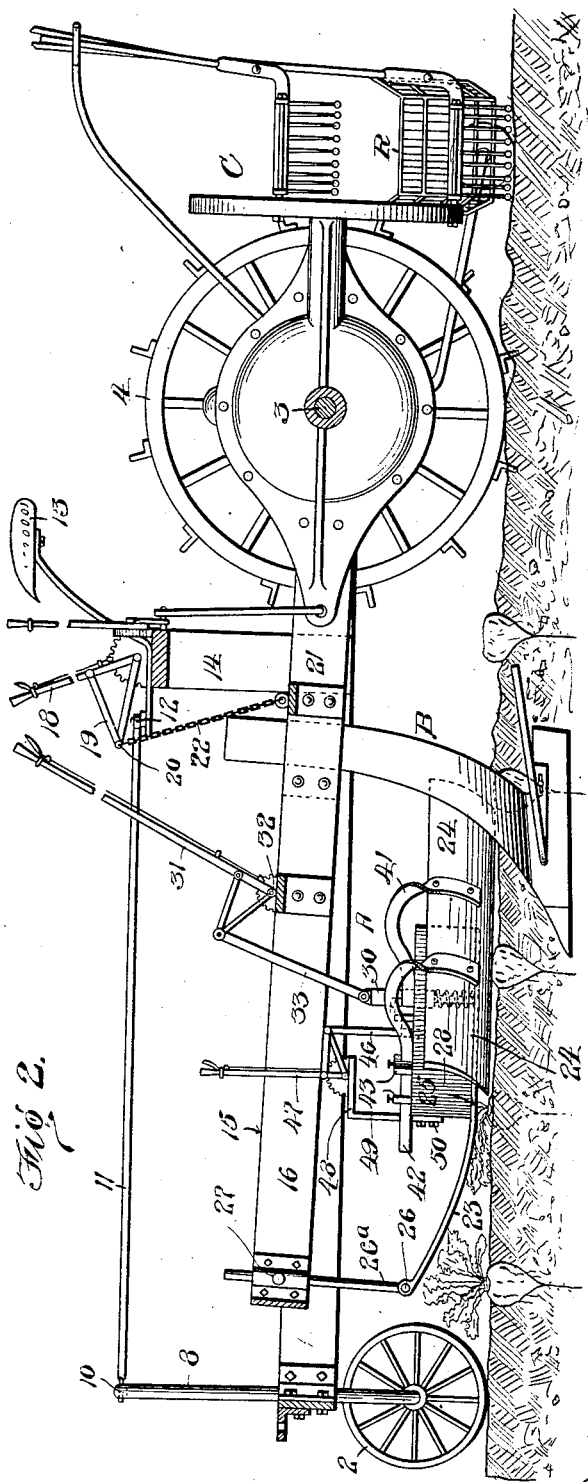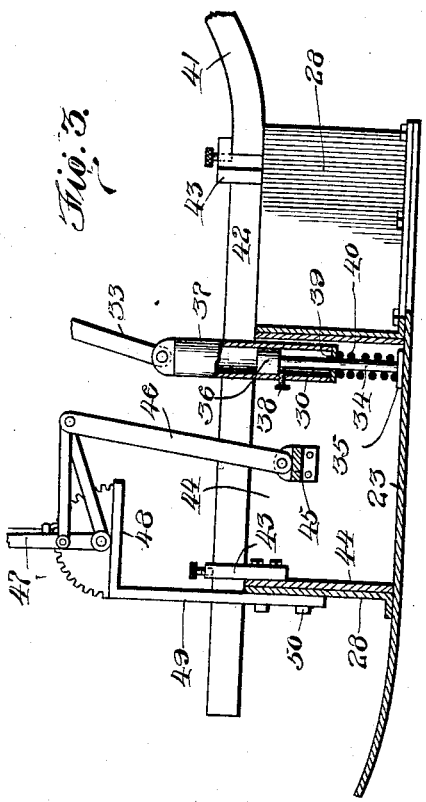

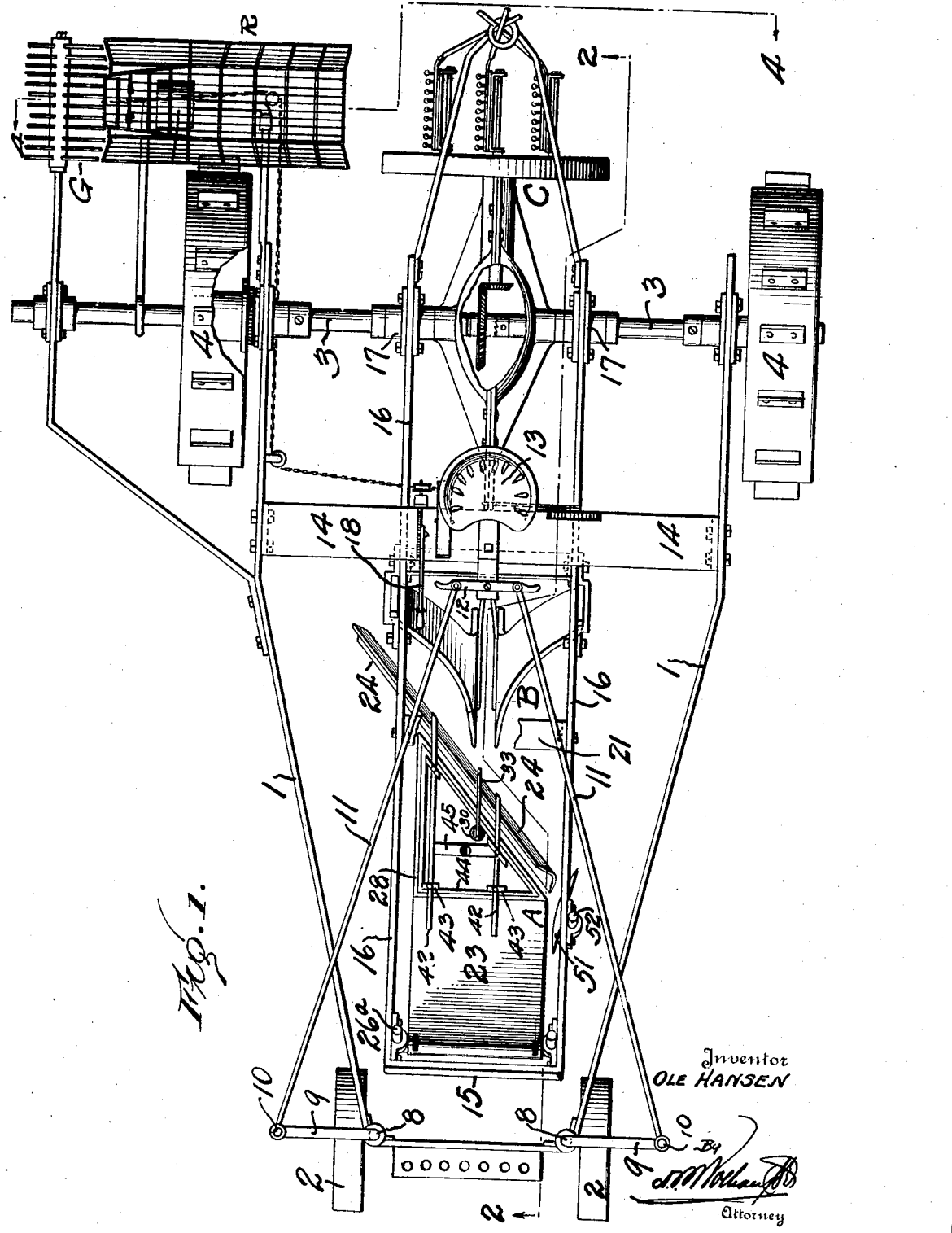

OLE HANSEN, OF LORENZO, IDAHO, ASSIGNOR OF ONE-HALF TO THOMAS C. SHIPPEN, OF LORENZO, IDAHO.

BEET-HARVESTING MACHINE.

1,319,069.   Specification of Letters Patent.   Patented Oct. 21, 1919.

Application filed September 13, 1917. Serial No. 191,229.

*To all whom it may concern:*

Be it known that I, OLE HANSEN, a citizen of the United States, residing at Lorenzo, in the county of Jefferson and State of Idaho, have invented certain new and useful Improvements in Beet-Harvesting Machines, of which the following is a specification.

This invention relates to agricultural implements and more particularly to a novel and improved beet harvesting machine.

To this end the invention contemplates a machine or implement of special utility in harvesting beets of the variety known as sugar beets, which grow to a relatively great size and have a comparatively thick foliage and stalk portion known as the "tops" above the surface of the ground.

In order for the grower to prepare the beets in acceptable condition for the refining mills it is necessary that the rank top portion be removed, and therefore in addition to digging the beets a topping operation is also necessary. If the beets are removed from the ground by plowing and then topped by hand it increases the cost of marketing to such an extent that the producer's profit is materially reduced, and therefore it is desirable to remove the tops simultaneously with the digging which not only has the advantage of eliminating one of the cost factors but at the same time enables the beets to be uniformly topped in a manner that meets the refiner's requirements. While devices have heretofore been provided for eliminating the operation of topping the beets by hand, which is both tedious and expensive, they have not been utilized to any great extent.

Accordingly, the present invention contemplates a simple and practical machine which may be drawn through the beet field to automatically remove the beet tops uniformly and rapidly, before the beets are removed from the ground, to thereby eliminate the topping by hand at a later stage of the handling. In this connection it is proposed to provide a novel beet topping device which is capable of simple and accurate adjustment and efficiently severs the rank top portions of the beets with minimum injury to the beet roots.

With the above and other objects in view which will more readily appear as the nature of the invention is better understood, the same consists in the novel construction, combination and arrangement of parts hereinafter more fully illustrated, described and claimed.

A preferred and more practical embodiment of the invention is shown in the accompanying drawings in which:—

Figure 1 is a top plan view of my improved machine.

Fig. 2 is a longitudinal sectional view thereof on the line 2—2 of Fig. 1.

Fig. 3 is a detail sectional view of the topping unit showing more clearly how the guard blade thereof is mounted with reference to the cutting blade.

Similar references designate corresponding parts throughout the several figures of the drawings.

As previously indicated the present invention has in view the provision of a novel topping unit, and by way of setting forth the relation thereof to the other operative instrumentalities of the machine, reference may be had to the accompanying drawings, wherein it will be observed that the reference character 1 designates a main frame having at its forward end a pair of guide wheels 2, while its rear end portion has suitably mounted therein a transverse axle 3 carrying adjacent the outer sides of the rotating frame the traction wheels 4—4.

In connection with the front guide wheels 2 it will be observed that the same are suitably journaled on the lower ends of steering posts 8—8 whose upper ends are formed with a crank portion 9 and are loosely connected, as indicated at 10, with rods 11 which are in turn pivotally connected with the steering foot rest 12 located directly in front of the driver's seat 13 preferably mounted upon the arched cross frame element 14 carried by the intermediate portion of the main frame 1.

Within the main frame 1 which is of open formation as shown in the drawings, is located an inner adjustable frame 15 which is preferably of substantially rectangular shape and includes the parallel side bars 16 whose ends are provided with suitable bearings 17 fitted to the axle 3, whereby the entire frame 15 is pivotally mounted on the rear axle, so that its front end can be raised or lowered as desired to accomplish the necessary adjustments as will hereinafter more fully appear. For the purpose of effecting the necessary adjustments of this frame, there is preferably provided adjacent the driver's seat 13 a suitable lever device 18 of a more or less conventional type having an off-set bracket portion 19 whose free end 20 is connected with the cross bar 21 of the frame by means of a flexible element 22 such as a chain or the like. In the position shown in Fig. 2, the frame 15 is in its working position. However, when it is desired to move the machine over the ground without bringing the topping unit into play the lever 18 is pulled rearwardly by the operator to thus lift the front end of the frame on the axle 3 as a fulcrum.

The inner adjustable frame 15 carries therewith a topping unit designated generally as A, and a digging unit B, which are respectively intended to remove the tops of the beets while the roots are still in the ground, and then lift the beets into such a position that they may be readily removed by the piling device designated generally as C and located at the rear of the machine.

With particular reference to the novel features of the topping device A, it will be noted that the same essentially includes in its organization a guard blade 23 and a cutting blade 24, the former being adapted to depress the rank foliage or tops of the beets in such a manner that the knife edge of the blade 24 will clearly and accurately remove the same from the beet-root without injury to the latter. For the purpose of facilitating cutting action of the blade 24 the same is preferably disposed obliquely to the longitudinal axis of the machine and consequently the edge 25 of the guard blade 23 is similarly disposed, and spaced therefrom a sufficient distance to permit the blade 24 to produce the desired shearing effect. Furthermore, it will be seen that the cutting blade 24 is longer than the guard blade, and, owing to its oblique disposition will carry the cut tops to one side and out of the way of the beet roots.

The said guard blade 23 may be advantageously pivotally supported at its forward end from a hanger bar 26 carried by a pair of rods 26$^a$ which are adjustably mounted in suitable brackets 27 carried by the inner front corners of the frame 15, while the portion thereof adjacent the cutting blade rigidly carries a suitable boxing 28 which as shown may be of triangular form.

For the purpose of adjusting the edge 25 of the guard 23, the latter has secured thereto adjacent the said edge a suitable raising and lowering device which preferably includes a tensioning device 30 directly associated with the blade 23, a hand controlled lever 31 pivoted to one of the bars 16 of the frame 15, as at 32, and having a link connection 33 with the upper end of the tensioning device 30. The rocking of the lever 31 by the operator will cause the raising and lowering of the edge 25 of the guard blade 23, since the forward end of the latter is pivotally supported on the hanger 26, while the tensioning device 30 yieldingly presses the free end of the guard blade downwardly on to the beet tops.

Any suitable form of tensioning device may be utilized for the purpose of yieldingly mounting the free end of the guard blade 23. However, the form of device 30 shown more clearly in Fig. 3 of the drawings may be employed. From this figure it will be observed that this device consists of a standard 34 fitted as at 35 to the guard blade and having an enlarged head portion 36 which telescopically fits within a tubular casing 37, and which latter is provided with screws 38 which extend radially into the interior thereof behind the lower edge of the head 36 to form a coupling between the standard 34 and the casing 37, whereby the rearward movement of the lever 31 may readily cause the lifting of the entire topping unit. At the lower end of the casing 37 there is preferably provided a washer or the like 39 which constitutes one abutment for a coil spring 40 surrounding the standard 34. With this arrangement the forward movement of the lever 31 will cause the spring 40 to be compressed and thus push the entire topping unit downwardly under spring tension, while the opposite movement will cause the lifting of the topping unit as heretofore stated.

The knife blade 24 of the topping unit A is preferably carried by suitable curved hanger-bar elements 41 whose forward horizontal ends 42 are adjustably mounted in suitable bracket elements 43 carried by the opposite walls of a slide-sleeve 44 which is similar in configuration to the boxing or casing 28 and slidably telescopes therewith. This interior telescopic member 44 is preferably provided with a cross bar 45 having connected therewith a link 46 whose upper end is connected with a lever 47 mounted upon one arm 48 of a bracket 49 which is carried by the outer boxing element 28 as indicated at 50. Since the forward horizontal portions 42 of the hangers or straps of the blade 24 are adjustable longitudinally in the brackets 43 it will be apparent that the space between the edge 25 of the blade 23 and the knife edge of the blade 24 may be readily varied horizontally, while by lifting the inner member 44 which carries the brackets 43 the space between the edges of the two blades may be adjusted vertically. Furthermore, through the provision of the adjustable mounting for the guard blade and the lever device the entire topping unit may be raised and lowered and also placed under spring tension.

For the purpose of protecting the shearing action of the blade 24 of the topping unit, the advance corner of this cutting edge thereof has located adjacent thereto a colter wheel 51 which is carried by the lower end of a standard 52 secured to one of the frame bars 16 of the inner frame. This colter is obliquely arranged and has the action of a harrow disk in turning the earth and trash away from the knife blade and thereby keeping the path of the latter clear for proper action.

With the arrangement described it will be apparent that the beets may be properly and uniformly topped, and the beets themselves removed to an out of the way position, whereby the further operations of digging, piling, etc., necessary to removing the beets from the field may be readily accomplished.

After the beet roots have been topped by the unit A and lifted from the ground by the digging unit B, the piling unit C at the rear of the machine comes into play to remove the same from their position in the hill and at the same time collect them in suitable quantities to render the loading thereof more expeditious.

That is to say, after the beets have been removed from the ground, the piling unit C tosses the same laterally into a suitable receiver R, preferably in the form of a basket or the like as shown, and having a suitable outlet gate G which may be controlled in a suitable manner by the operator to release the beets collected in the receiver R.

From the foregoing it will be apparent that the novel topping unit heretofore described renders the topping of the beets accurate and owing to the wide range of adjustment between the guard blade and the cutting blade the tops can be severed from the root at any desired point while the cutting blade, owing to its relatively great length carries the rank top portions which are severed from the roots to one side leaving the roots free to be removed from the earth by the digging unit. In this latter connection the provision of a relatively long cutting blade in the topping unit clears the earth around the beets in such a manner that when the piling unit comes into play to throw the beets from the hill into the receiving element there will be no rank tops transferred along therewith.

When the machine is being brought to and from the beet field the inside frame 15 may be elevated to raise both the topping unit A and digging unit B to an inoperative position. On the other hand, when it is desired to bring all the devices of the machine into operation the frame 15 is simply lowered, and the various instrumentalities adjusted to the proper set, and if necessary the plow shares of the digging unit may also be raised or lowered to obtain the required depth for removing the beets from the ground.

In the practical carrying forward of the invention it will of course be understood that the constructional details of the machine may be made of material suitable for the purpose and of proper design and dimension according to manufacturing requirements, it being apparent that the frames may be constructed of suitable bars in one piece as shown, or in several pieces suitably connected and braced together, as well as various changes resorted to in the minor details of construction without departing from the spirit of the invention and within the scope of the appended claims.

I claim:—

1. In a beet harvesting machine, a topping unit including a top depressing guard plate, means for adjustably supporting the same at its front end, a manually operated device for raising and lowering the rear end, and means for cutting the tops including a vertically adjustable support carried by the rear portion of the said plate, a horizontally adjustable support carried by the vertically adjustable support, and a cutting blade carried by said horizontally adjustable support.

2. In a beet harvesting machine, a topping unit including a top depressing guard plate, adjustable means for pivotally supporting said plate at its front end, a manually operated lever device having a resilient connection with the rear portion of the guard plate, and adapted to raise and lower the same, an adjustable cutting unit mounted also on the rear end of the guard plate and including an obliquely mounted cutting blade.

3. In a beet harvesting machine, a topping unit including a top depressing guard plate, adjustable means for pivotally suspending said guard plate at its front end, a manually operated lever device resiliently connected with the rear end of the guard plate for swinging the same on its forward pivot, a fixed supporting member carried by the rear portion of the guard plate, a vertically adjustable member engaging with said fixed support, lever means carried by the fixed support for effecting the adjustment of the vertically movable member, horizontally adjustable bars carried by the vertically adjustable member, and an obliquely disposed cutting blade carried by said bars.

4. In a beet harvesting machine, a topping unit having a pivotally supported adjustable guard member, and a cutting blade carried by the latter and having its shearing edge adjustable horizontally at right angles to the fixed rear edge of the guard plate and also vertically, and means connected with the rear end of the guard plate for raising and lowering the entire topping unit.

5. A beet harvesting machine including a topping unit having a guard member, an adjustable hanger for pivotally supporting the front end of the guard member, a boxing rigidly carried by the guard member at the rear end thereof, a slidable sleeve within said boxing, brackets carried thereby, a cutting blade, hanger members secured to said blade and adjustably engaging said brackets, a lever carried by the said boxing and operatively connected to the slidable sleeve to raise and lower the same, and means connected with the guard blade for adjusting the entire topping unit.

In testimony whereof I hereunto affix my signature in the presence of two witnesses.

OLE HANSEN.

Witnesses:
ELLA N. HILDEBRAND,
EMORY L. GROFF.

Copies of this patent may be obtained for five cents each, by addressing the "Commissioner of Patents, Washington, D. C."